(12) United States Patent
Jenkins

(10) Patent No.: US 6,854,666 B2
(45) Date of Patent: Feb. 15, 2005

(54) HEADLAMP CLEANING DEVICE

(75) Inventor: Martyn Jenkins, Pontypool (GB)

(73) Assignee: Kautex Textron GmbH & Co. KG, bonn (DE)

( * ) Notice: Subject to any disclaimer, the term of this patent is extended or adjusted under 35 U.S.C. 154(b) by 0 days.

(21) Appl. No.: 10/232,160

(22) Filed: Aug. 30, 2002

(65) Prior Publication Data
US 2003/0066909 A1 Apr. 10, 2003

(30) Foreign Application Priority Data

Aug. 31, 2001 (EP) .............................. 01120982

(51) Int. Cl.$^7$ .............................. B05B 1/10; B05B 1/28; B05B 15/04; B60S 1/46
(52) U.S. Cl. .................. 239/284.2; 239/288; 239/284.1
(58) Field of Search ............................ 239/284.2, 288, 239/284.1, 288.3, 288.5; 15/250.002; 134/172, 179

(56) References Cited

U.S. PATENT DOCUMENTS

| 4,752,032 | A |   | 6/1988  | Costa et al. ............. 239/284.2 |
| 5,242,114 | A | * | 9/1993  | Camier et al. ........... 239/284.2 |
| 5,269,464 | A | * | 12/1993 | Epple et al. ................. 239/130 |
| 6,152,385 | A | * | 11/2000 | Nuber et al. ............. 239/284.2 |

FOREIGN PATENT DOCUMENTS

| DE | 38 17 257    | 11/1989 | ............ B60S/1/56 |
| DE | 196 26 179   | 1/1998  | ............ B60S/1/52 |
| EP | 0 950 558    | 10/1999 | ............ B60S/1/52 |
| EP | 0 950 588    | 10/1999 | ............ B60S/1/52 |
| FR | 2 657 057    | 7/1991  | ............ B60S/1/52 |
| FR | 2 738 166    | 3/1997  | ............ B05B/1/10 |
| WO | WO 00/51745  | 8/2000  | ............ B05B/1/00 |

\* cited by examiner

Primary Examiner—David A. Scherbel
Assistant Examiner—Darren Gorman
(74) Attorney, Agent, or Firm—Grossman Tucker Perreault & Pfleger, PLLC

(57) ABSTRACT

The invention concerns a device for cleaning headlamps on motor vehicles using a cleaning fluid to be discharged through at least one spray nozzle. The spray nozzle, in a rest position, is arranged concealed or recessed in the bumper or the bodywork of the motor vehicle and can be positioned by an actuator in a cleaning position. The cleaning device according to the invention is distinguished in that the spray nozzle is arranged on a mounting which is secured pivotably to the bodywork and which in the rest position is pivoted into the bodywork and which can be pivoted out into the cleaning position by the actuator.

11 Claims, 13 Drawing Sheets

HEADLAMP CLEANING DEVICE

Figure 1:
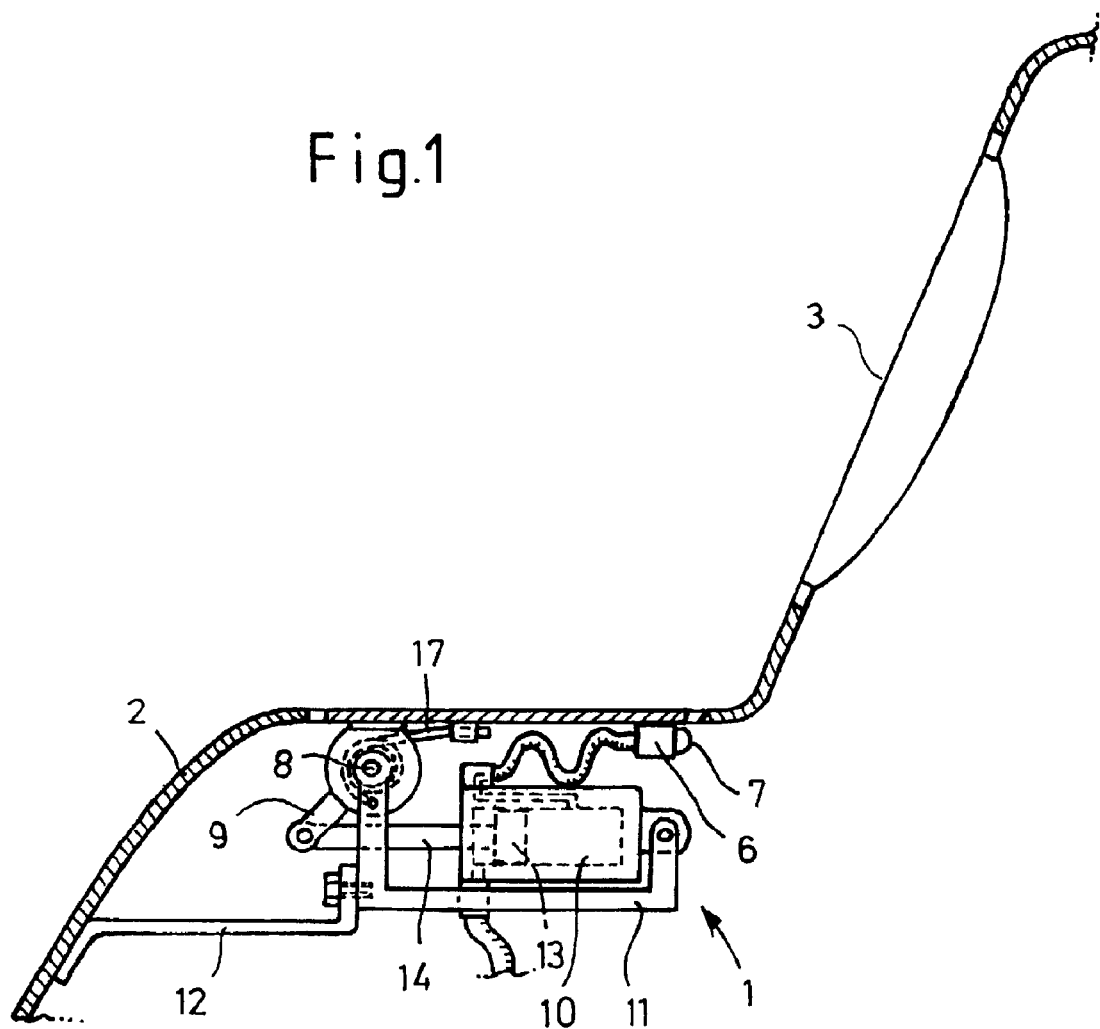

The invention concerns a device for cleaning headlamps, windscreens or the like on a motor vehicle by means of cleaning fluid which is to be discharged through at least one spray nozzle, wherein in the rest position the spray nozzle is arranged concealed and/or recessed in the bodywork of the motor vehicle and by means of an actuator can be positioned in a cleaning position in which discharge of the cleaning fluid is effected.

As is known, headlamps and windscreens on motor vehicles are cleaned by way of wipers which are arranged pivotably in front of the windscreen or the headlamp and which clean the surface of the glass under the action of the wiper blade and with the application of cleaning fluid issuing from spray nozzles. In recent times the covers of the front headlamps of motor vehicles comprise plastic cover members which are comparatively susceptible to scratching. The use of wipers for cleaning headlamp covers is now no longer envisaged because of the sensitivity to scratching of the material involved. The wipers would spread the particles of dirt which are to be found on the headlamp covers, over the surface thereof, and would leave behind corresponding traces of scratching.

In addition the headlamps of modern motor vehicles for the major part involve curvaceous and aerodynamically adapted external contours which also make it difficult or impossible to use conventional wipers. Finally, wipers which are arranged visibly in front of the headlamp are also undesirable for aesthetic reasons.

Modern headlamp cleaning systems therefore no longer employ wipers, but rather the headlamp cover is only cleaned by the jet of a cleaning fluid which is discharged under pressure from a spray nozzle. In that respect it is desirable for the spray nozzle to be arranged in front of the headlamp cover in such a way that an optimum cleaning result is achieved with the lowest possible cleaning fluid consumption. It is easy to imagine that the pressure to be applied is a function of the spacing and the arrangement of the spray nozzle in relation to the headlamp cover.

In the case of known headlamp cleaning arrangements which do not involve the use of wipers the spray nozzles were mounted in an exposed position on the bumper of the motor vehicle. In order to achieve the correct spacing and the correct angle of the jet of cleaning fluid in relation to the headlamp cover, it is known for the spray nozzles to be mounted on small horn-like projections on the bumper.

In modern headlamp cleaning arrangements the spray nozzles are arranged in concealed relationship. For that purpose, provided in the region of the headlamps in the bodywork or in the bumper is an opening from which the spray nozzle in question can be telescopically extended. Those headlamp cleaning devices are also known as 'pop up nozzles'. In such a case the spray nozzle is arranged beneath a cover which closes the opening in the bodywork or the bumper of the motor vehicle in flush relationship. The nozzle with the cover are fixed on a telescopic cylinder arrangement which is held in the retracted position by means of a return spring. The cylinder arrangement can be hydraulically actuated by way of the pressure of the cleaning fluid, in which case firstly the pressure of the return spring acting on the cylinder has to be overcome upon extension of the spray nozzle by way of the pressure of the cleaning fluid.

The greater the stroke movement of such an arrangement is to be, the correspondingly greater amount of cleaning fluid is required for the extension movement of the nozzle.

That gives rise to various disadvantages. On the one hand, it is desirable to minimise the delivery of cleaning fluid. The need for a large volume of cleaning fluid to provide for extension of the nozzle is not in conformity with that requirement. In addition, it is desirable to minimise the cleaning fluid pressure as the implementation of headlamp washing arrangements which operate under high pressure requires expensive pumps and hose connections which still ensure sealing integrity in relation to pressure surges, and that overall increases the costs involved.

Finally, a comparatively large amount of space is required for the whole arrangement in the bumper or in the bodywork.

Therefore the object of the present invention is to improve a device for cleaning headlamps, windscreens or the like, of the kind set forth in the opening part of this specification, in such a way that the above-indicated disadvantages are very substantially avoided.

That object is attained in that the spray nozzle is arranged on a mounting which is secured pivotably to the bodywork and which in the rest position is pivoted into the bodywork and can be pivoted out into the cleaning position by the actuator.

The fact that the spray nozzle can be extended pivotably out of the bodywork means that it can be more easily placed in a suitable position in front of the surface to be cleaned. In addition, less space is required within the bodywork for fitting the assembly there. It is for example easily possible for the actuator to be disposed transversely within the bodywork, that is to say approximately parallel to the axis of pivotal movement of the mounting and approximately parallel to the outside surface of the bodywork.

In addition a pivotable arrangement of the spray nozzle makes it possible to provide for any limitations in terms of the angle of pivotal movement. Such an extension mechanism is particularly suitable for cleaning headlamps which are at a comparatively slight angle of incidence in the direction of travel of the vehicle.

A preferred embodiment of the cleaning device according to the invention provides that the mounting is arranged under a pivotable flap which in the rest position covers an opening in the bodywork in flush relationship.

The spray nozzle may be secured for example to the side of the flap which is concealed in the rest position so that it is not visible in the rest position. It is self-evident to the man skilled in the art that the device may also have two or more spray nozzles. Desirably, the actuator is operated hydraulically, that is to say for example by the pressure of the cleaning fluid to be expelled from the spray nozzle. In that respect, the hydraulic pressure of the cleaning fluid is firstly put to use in known manner for implementing the extension movement of the spray nozzle or the flap. When the flap comes to bear against an end-of-travel abutment the pressure of the cleaning fluid naturally rises. That rise in pressure can be put to use to open a pressure relief valve which opens the path to the spray nozzle and thus permits fluid to be discharged therefrom.

Preferably the actuator acts on at least one pivot arm or pivot lever which produces the extension movement of the spray nozzle into the cleaning position.

In order to ensure that, upon the conclusion of a washing operation, the arrangement is caused automatically to pivot into the rest position, the spray nozzle is preferably held in the rest position by a return spring. When the spray nozzle is pivoted out into the cleaning position the actuator firstly has to overcome the spring force of the return spring.

Desirably the actuator is in the form of a piston-cylinder unit which is operated by the hydraulic pressure of the cleaning fluid.

An embodiment of the invention provides that the actuator includes a piston rod which acts on the pivot arm in such a way that the linear stroke movement of the piston is converted into a rotary movement of the pivot arm about the pivot axis. Such an arrangement for the actuator takes up comparatively little space, compared to a telescopically operative extension mechanism. In addition, comparatively little cleaning fluid is required to operate the actuator according to the invention, more specifically about one fifth of the amount of fluid compared to a telescopic extension mechanism.

In an alternative configuration of the cleaning device which takes up even less space, the piston of the actuator acts with its end directly on a traction element which passes through the cylinder and which is connected to the pivot arm. That saves on the installation space for the piston rod.

The pivot arm can be pivotably mounted to a holder for the piston cylinder unit or the cylinder housing itself.

In another alternative configuration of the cleaning device according to the invention the actuator can be in the form of a hydraulic rotary drive whose axis of rotation corresponds to the pivot axis of the pivot arm. A comparable rotary drive is known for example from WO 00/51745.

The rotary drive preferably includes a piston which is linearly movable within a cylinder and which can be acted upon by the cleaning fluid and which acts on a rotor carried rotatably and longitudinal movably therein, the rotor having a trunnion forming the pivot axis of the pivot arm. Such a rotary drive is particularly compact and saves on a great deal of space as it extends on the pivot axis of the pivot arm or a pivot arm assembly.

As already indicated hereinbefore it is possible to provide a pivot arm assembly comprising two pivot arms which are rotatable about a common pivot axis. Such an arrangement is particularly strong and stable, which is desirable having regard to wind pressure which may act on the cleaning device.

A first embodiment of the cleaning device according to the invention provides that the flap can be erected at its side associated with the surface to be cleaned, with the pivot axis extending approximately at the height of the outer surface of the bodywork.

As an alternative thereto it can be provided that the mounting is in the form of a cover member which can be lifted out of the bodywork and pivoted into a position in front of the surface to be cleaned and which in the rest position closes an opening in the bodywork in flush relationship.

In that case the spray nozzle is to be provided on the outside of the cover. That arrangement has the advantage that the cleaning device can be positioned at a particularly favourable angle in front of the surface to be cleaned and in particular in close proximity of and in front of that surface.

Desirably there are provided means for guiding the cleaning fluid through the actuator to the spray nozzle.

The cleaning fluid can be guided through hoses, or as an alternative thereto it can be provided that there is at least one conduit in at least one pivot arm for carrying the cleaning fluid to the cleaning fluid nozzle. That makes it possible to do away with any cleaning fluid hoses which are to be provided, thereby making the arrangement particularly compact.

The cleaning device according to the invention is preferably integrated into a bumper or the trim surround thereof of a motor vehicle.

Figure 2:
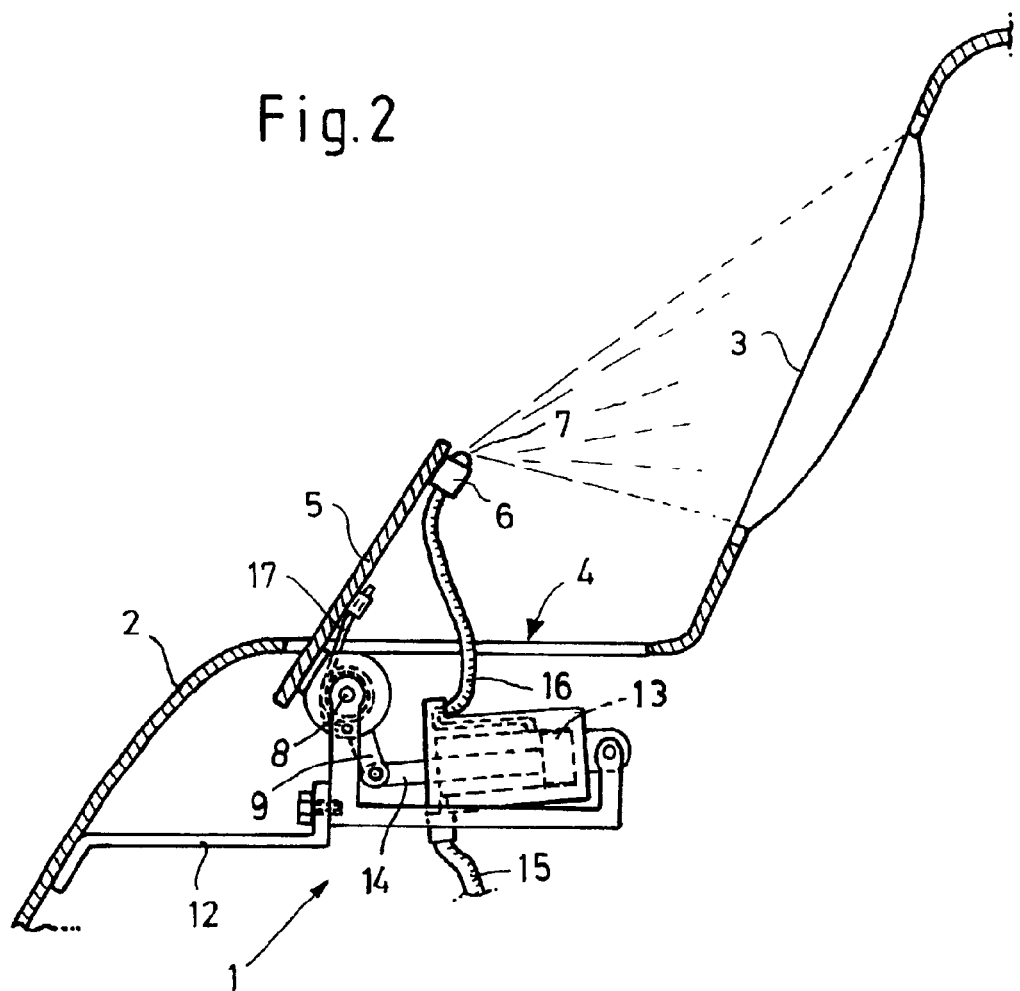
Figure 3:
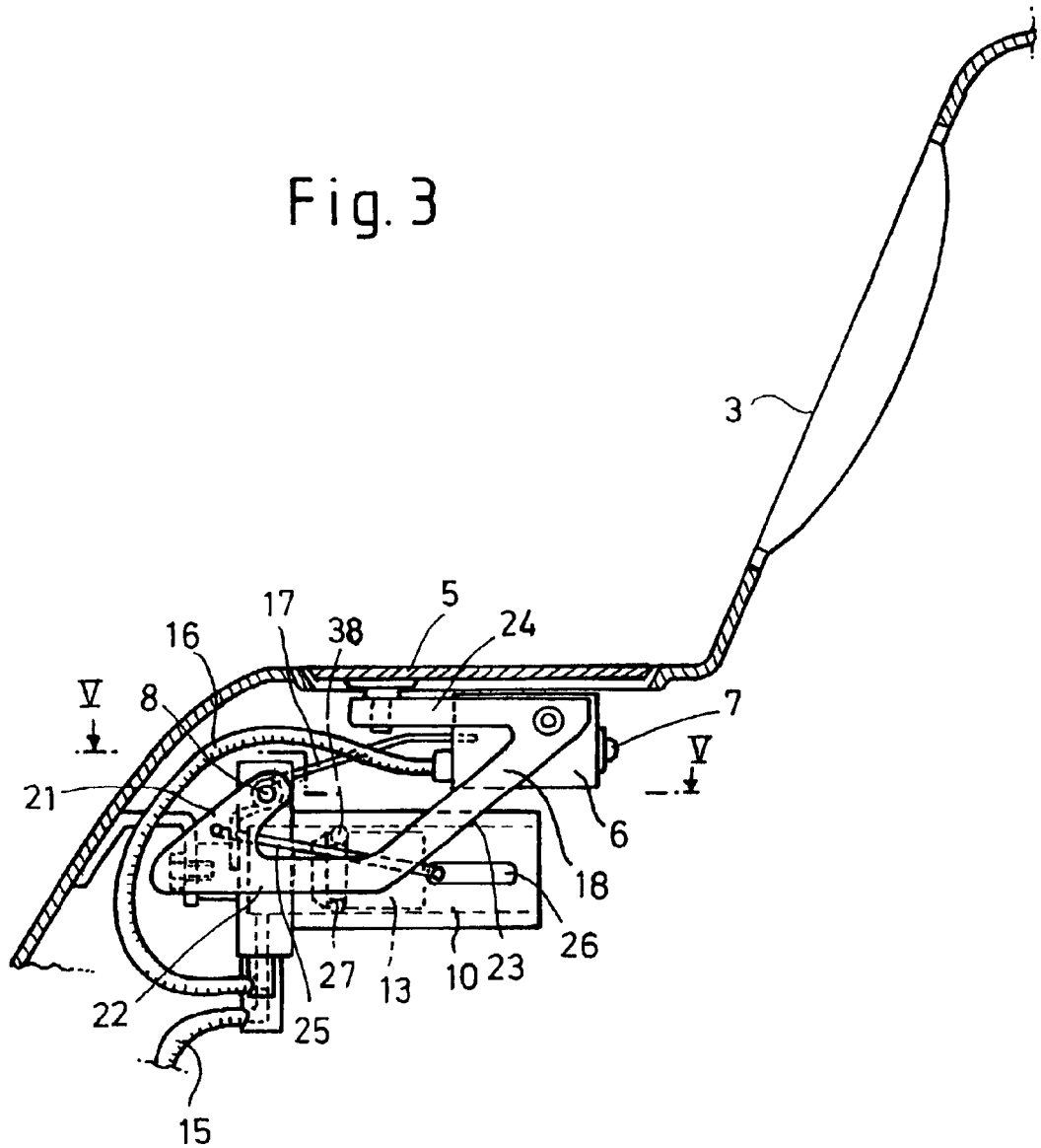
Figure 4:
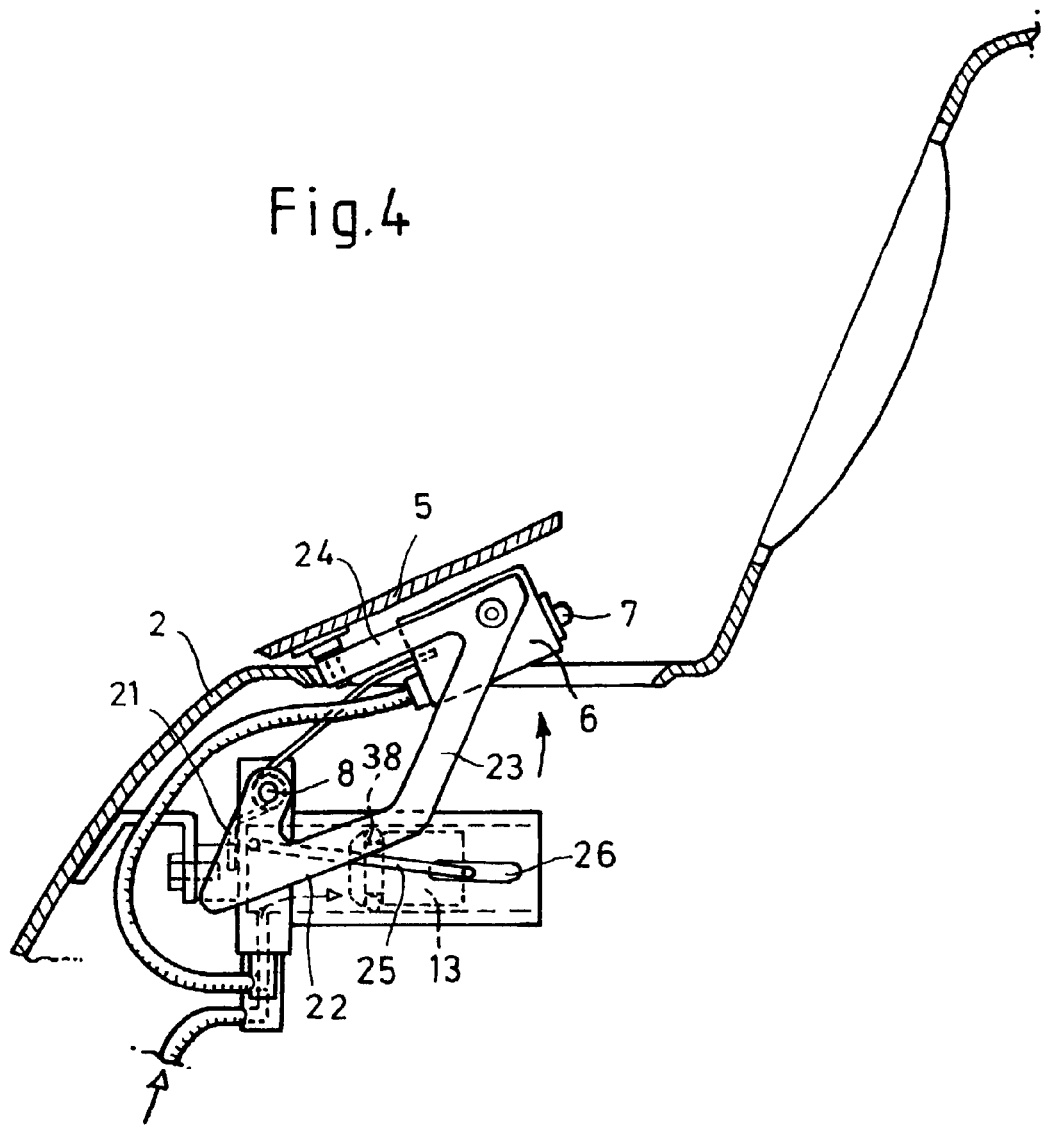
Figure 5:
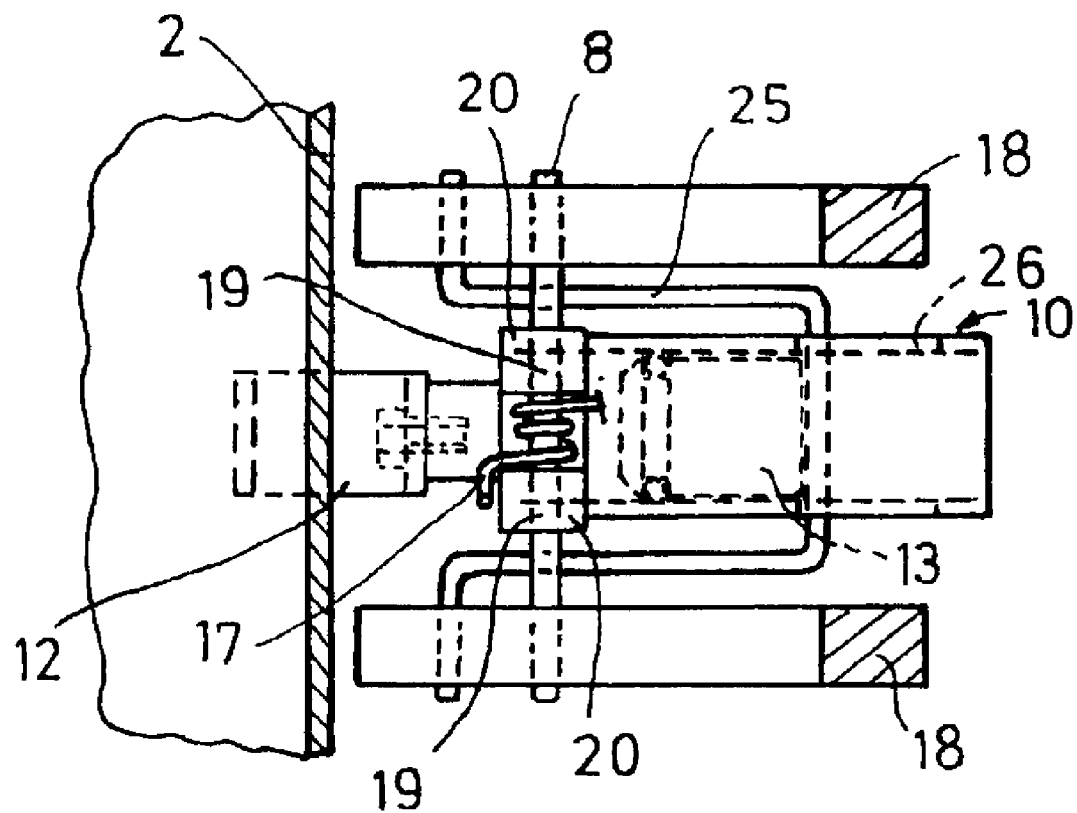
Figure 6:
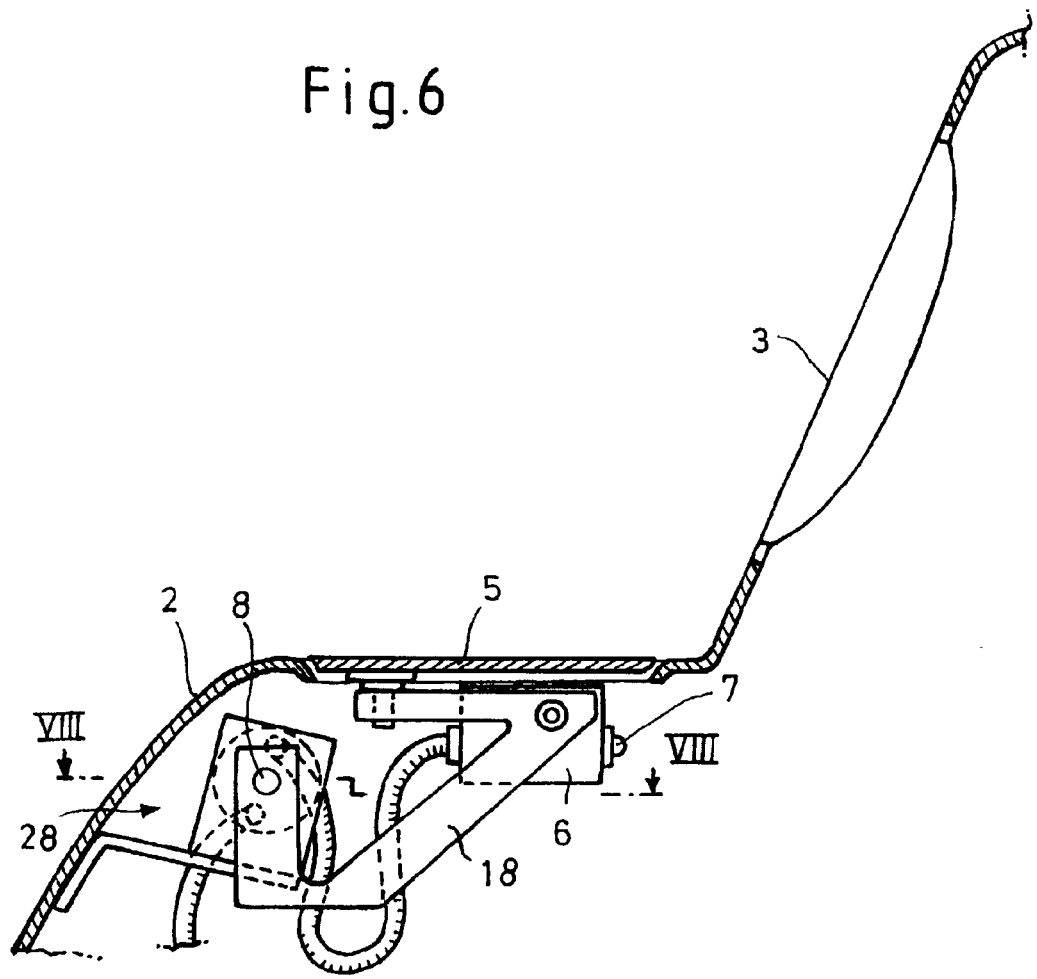
Figure 7:
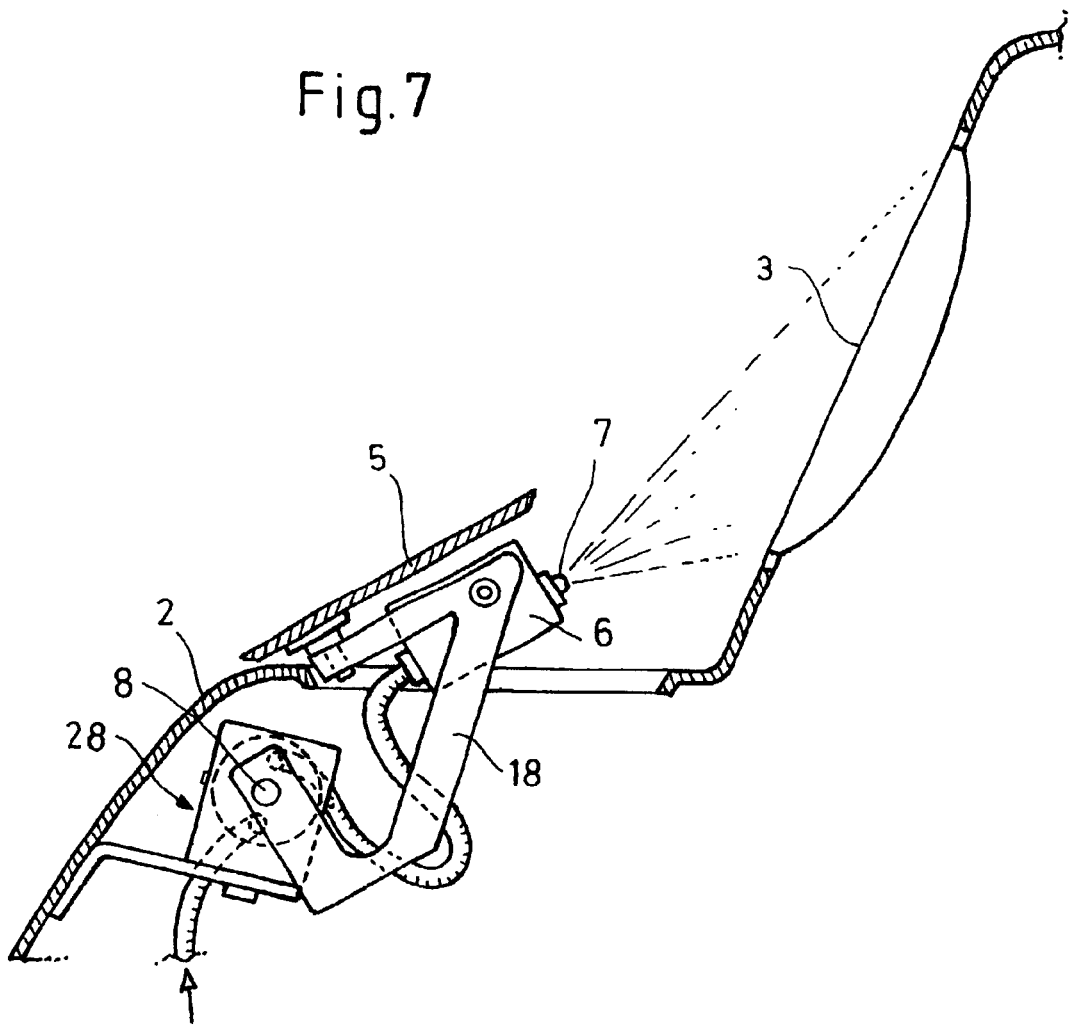
Figure 8:
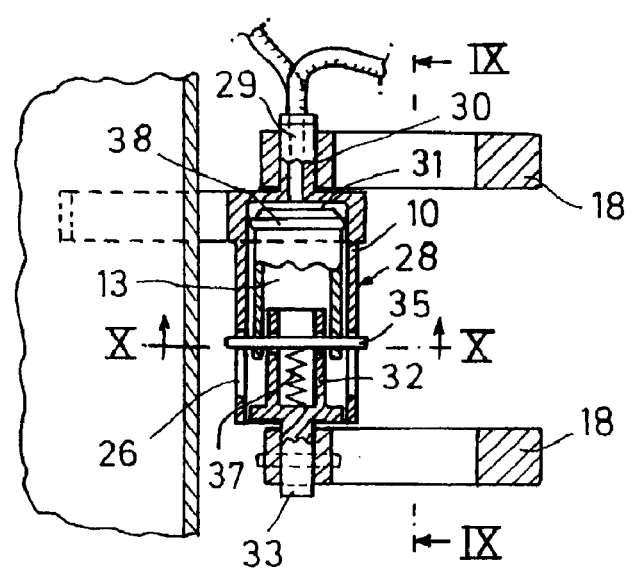
Figure 9:
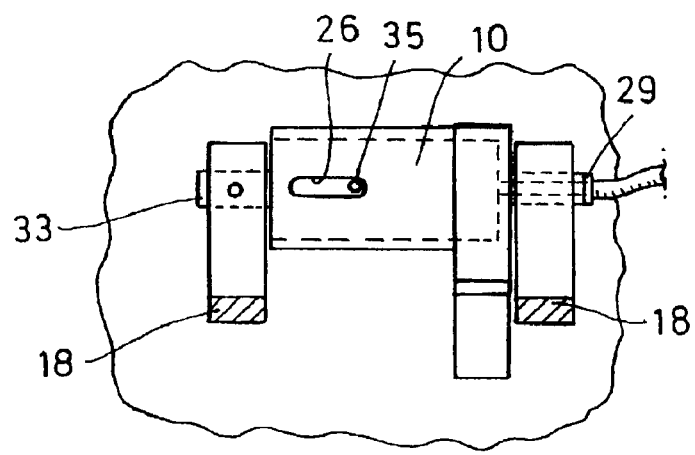
Figure 10:
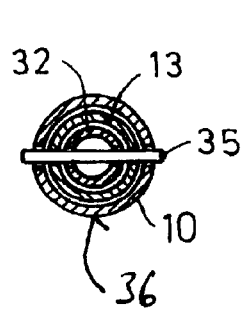
Figure 11:
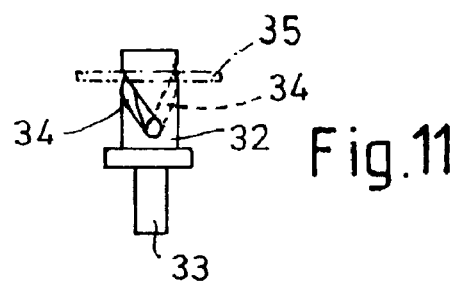
Figure 12:
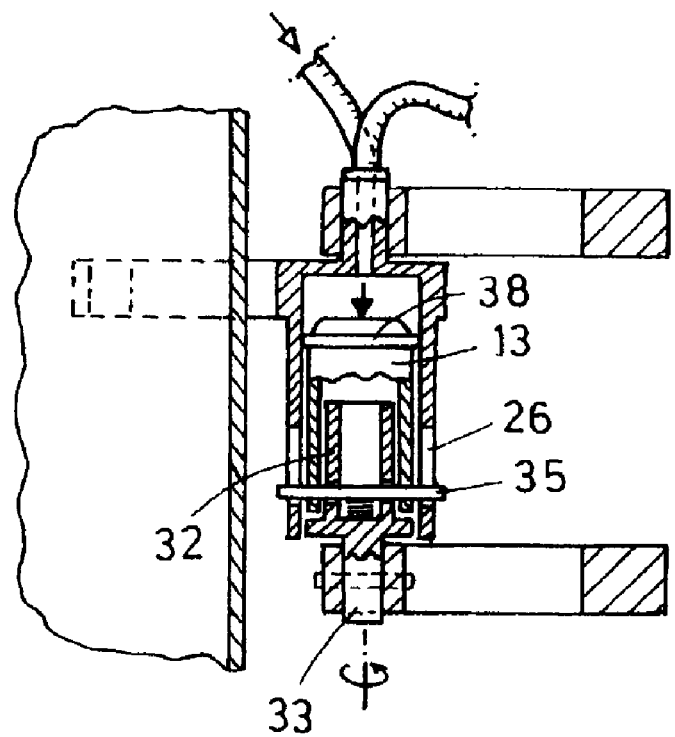
Figure 13:
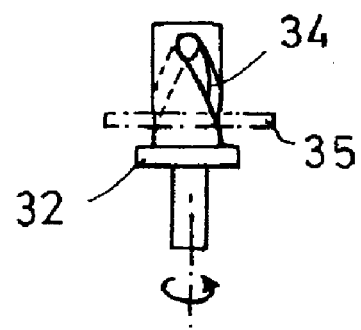
Figure 14:
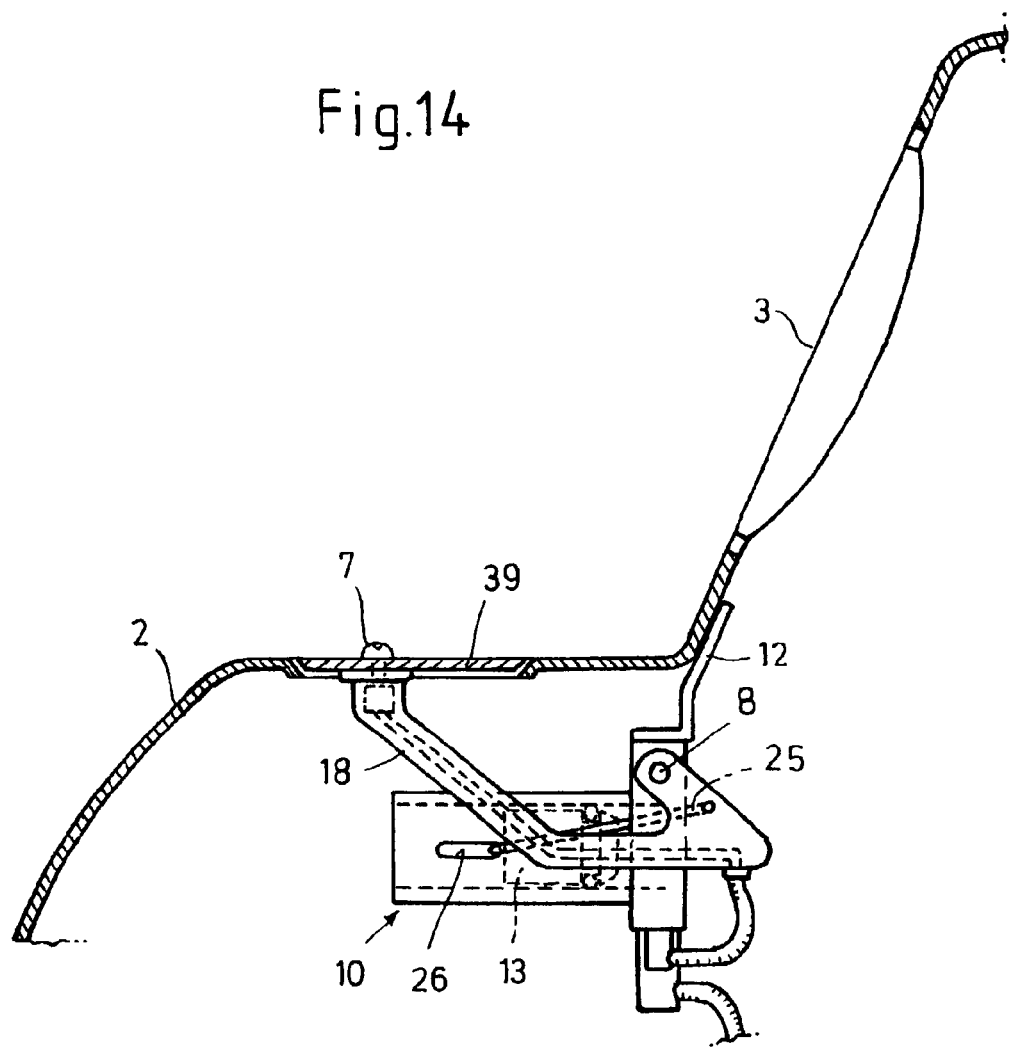
Figure 15:
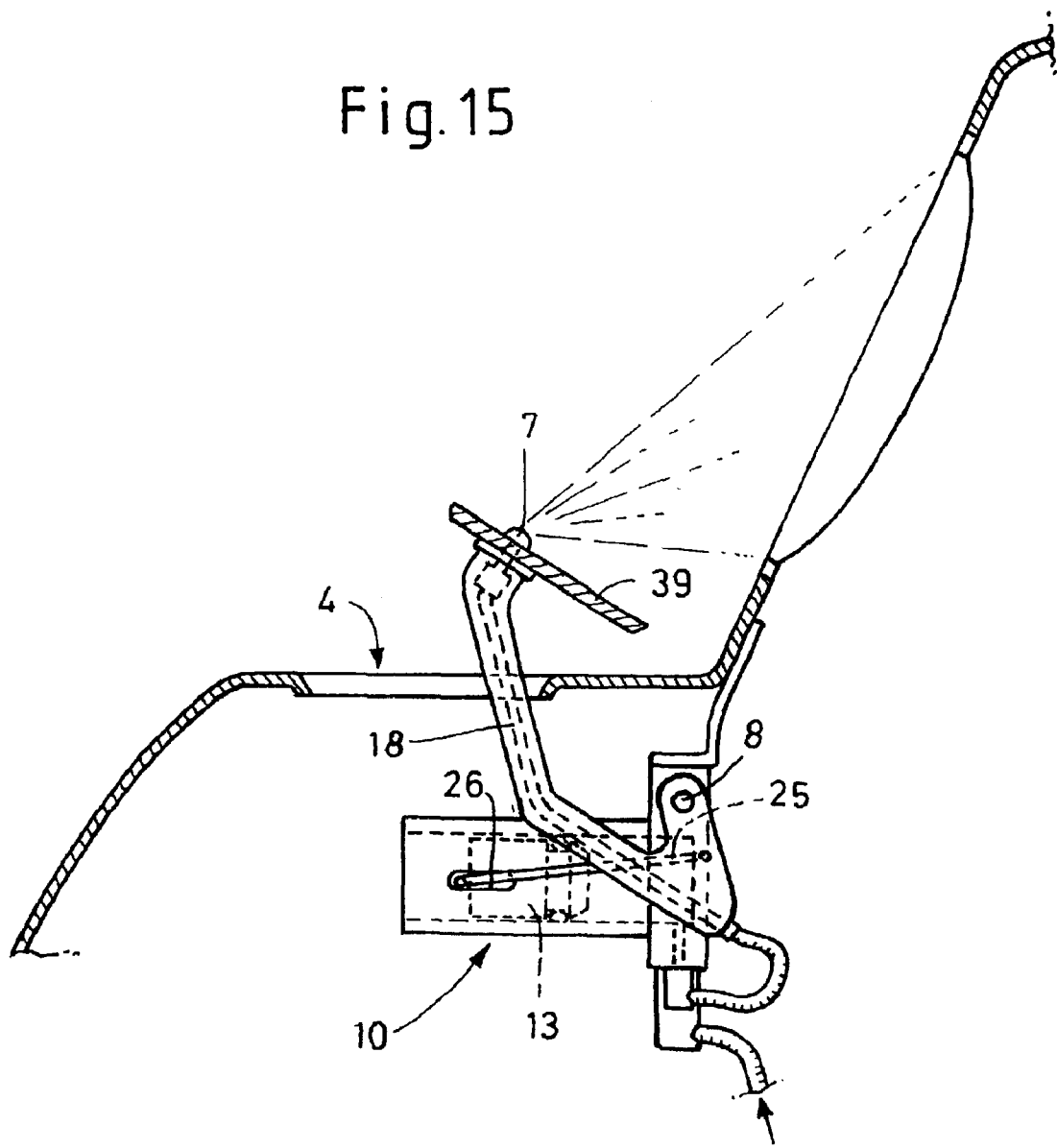
Figure 16:
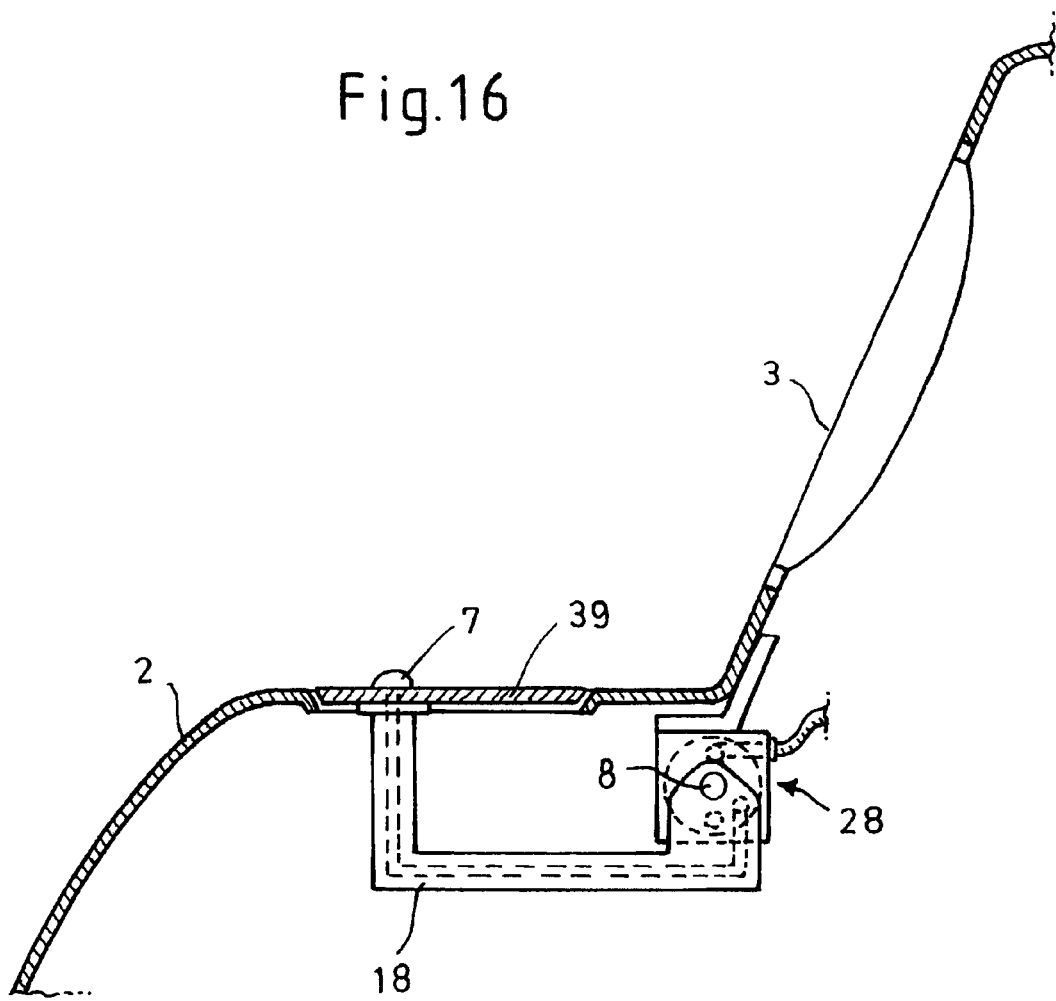
Figure 17:
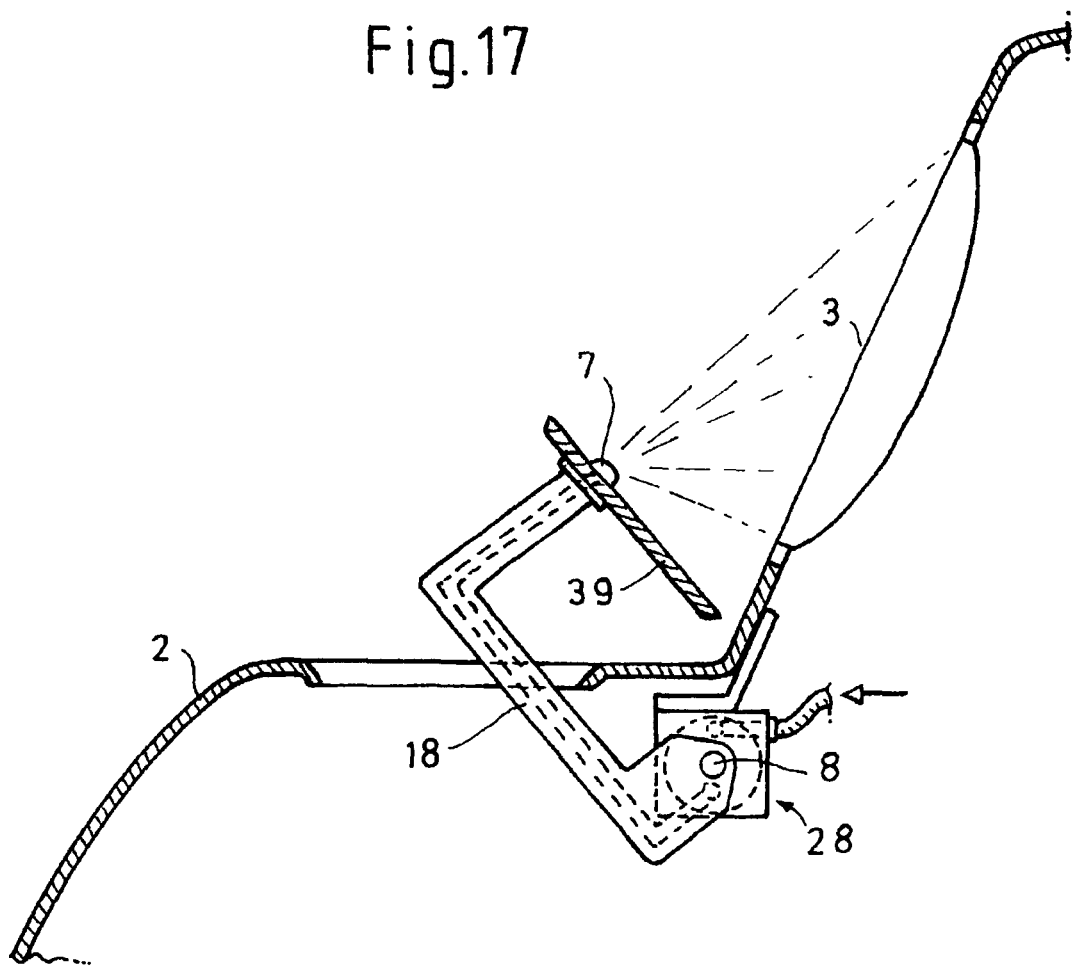

The invention is described in greater detail hereinafter by means of embodiments illustrated in the drawings in which:

FIG. 1 shows the bumper of a motor vehicle in section with a cleaning device arranged therein in accordance with a first embodiment of the invention, in the rest position thereof, FIG. 2 shows the cleaning device of FIG. 1 in the cleaning position, FIG. 3 shows a view in section corresponding to FIGS. 1 and 2 with a cleaning device in accordance with a second embodiment of the invention, the device being shown in the rest position, FIG. 4 shows the device of FIG. 3 half-way to the cleaning position, that is to say to the extended position, FIG. 5 is a view in section taken along line V—V in FIG. 3, FIG. 6 shows the cleaning device in accordance with a third embodiment of the invention in the rest position, FIG. 7 shows the cleaning device of FIG. 6 in the cleaning position, FIG. 8 shows a view in section taken along line VIII—VIII in FIG. 6, FIG. 9 shows a view in section taken along line IX—IX in FIG. 8, FIG. 10 shows a view in section taken along line X—X in FIG. 8, FIG. 11 shows a view of the rotor of the rotary drive, FIG. 12 shows a view in section through the rotary drive when the cleaning device of the third embodiment of the invention is in the extended or cleaning position, FIG. 13 shows a view illustrating the position of the rotor when it has encountered an end-of-travel abutment, FIG. 14 shows the cleaning device in accordance with a fourth embodiment of the invention in the rest position, FIG. 15 shows the cleaning device illustrated in FIG. 14 in the cleaning position, FIG. 16 shows the cleaning device in accordance with a fifth embodiment of the invention in the rest position, and FIG. 17 shows the cleaning device illustrated in FIG. 16 in the cleaning position.

FIGS. 1 and 2 show a cleaning device 1 in accordance with a first embodiment of the invention. This cleaning device 1 is in the form of a headlamp cleaning device, but it will be appreciated that the invention is to be interpreted in such a fashion that such a cleaning device can also be designed for cleaning windscreens or the like.

In the illustrated embodiments, the cleaning device 1 is integrated into a bumper 2 in front of the front headlamps 3 of a motor vehicle. Provided in the bumper 2 or the trim surround or covering thereof is an opening 4 which for example is stamped out or which was already produced upon manufacture of the bumper 2.

Hereinafter, for the sake of simplicity, the region of the vehicle bodywork in front of the front headlamps 3 will be referred to as the bumper, but in general terms that will be the plastic trim or cladding, within which the actual shock-absorbing bumper structure is arranged. As already mentioned hereinbefore the cleaning device 1 can in principle be integrated anywhere in the bodywork of a motor vehicle or in a trim portion of the bodywork.

In the embodiment illustrated in FIGS. 1 and 2 the opening 4 in the bumper 2 is closed by a flap 5 which is fitted thereinto in flush relationship, while secured to the underside thereof is a spray nozzle housing 6 with spray nozzles 7 carried thereon. The flap 5 is in turn mounted at a pivot axis 8 on a spindle provided with a pivot lever 9. The pivot spindle 8 and a cylinder 10 are in turn supported in a fixing bracket 11. The fixing bracket 11 is mounted to the inside of the bumper 2 by way of a holder identified by reference 12.

A piston 13 which can be acted upon by cleaning fluid is linearly slidably arranged in the cylinder 10. The piston 13 has a piston rod 14 which in turn is pivotably connected to the pivot lever 9.

The linear actuator formed by the cylinder 10, the piston 13 and the piston rod 14 is supplied with cleaning fluid by way of a supply line identified by reference numeral 15, by way of a pump (not shown), from a cleaning fluid reservoir or tank which is also not shown. The cleaning fluid acts on the piston 13, on the side thereof which is towards the piston rod 14, and thereby moves the piston 13 into the position shown in FIG. 2. That causes the pivot lever 9 to be entrained into the position illustrated in FIG. 2, which thereby entails a rotary movement of the pivot spindle 8 and an outward extension movement of the flap 5. When the piston 13 is in the limit position shown in FIG. 2 the cleaning fluid can flow to the spray nozzle 7 through the cylinder 10 and the feed line 16.

The supply line 15 and the feed line 16 are in the form of hoses in the illustrated embodiment. In the simplest case, the cleaning fluid is allowed to flow to the spray nozzle 7 by a pressure relief valve which is arranged in the spray nozzle housing 6 and which opens when the pressure in the feed line 16 or in the cylinder 10 rises above a predetermined value. Alternatively, it could be provided that a valve is mechanically opened or actuated when the piston 13 is in the limit position shown in FIG. 2. Such alternative solution is indicated in FIGS. 1 and 2 by the broken lines showing a conduit or passage way for the washing fluid which allows flow of the washing fluid only when the piston 13 is in its limit position.

When the feed of cleaning fluid ceases the flap 5 is moved back into the closed position shown in FIG. 1 by the force of a return spring 17.

It should be noted at this juncture that the term actuator in accordance with the invention is used to denote the drive for producing the outward extension movement of the cleaning device.

Reference will now be made to FIGS. 3 and 4 showing a second embodiment of the cleaning device 1 according to the invention, which also involves a recumbent arrangement of the actuator (the telescopic cylinder arrangement in accordance with the state of the art is in comparison to be considered as an upright arrangement of the actuator).

In the embodiments described hereinafter, functional components are each denoted by the same respective reference numeral.

As can be clearly seen from FIGS. 3 and 4 the cleaning device 1 illustrated therein, in a comparable manner to the cleaning devices shown in FIGS. 1 and 2, is provided with an outwardly pivotable flap 5, at the underside of which is arranged a spray nozzle housing 6 with spray nozzles 7. The flap 5 is carried by two pivot arms 18 which are arranged rotatably about the common pivot axis 8 formed by a spindle. The pivot spindle 8 extends through mounting bores 19 in mounting projections 20 integrally connected to the cylinder 10. Between the mounting projections 20 the pivot spindle 8 is surrounded by a return spring 17 which is supported on the one hand against a mounting projection 20 and on the other hand against the spray nozzle housing 6. In this embodiment the spray nozzle housing 6 is mounted to the pivot arms 18 therebetween. The flap 5 in turn is also carried by the pivot arms 18. In contrast thereto the first embodiment (FIGS. 1 and 2) provides that the spray nozzle housing 6 is secured directly to the flap 5.

The pivot arms each form a respective first leg 21 which extends radially from the pivot axis or spindle 8 and which acts as a pivot lever, a second leg 22 which extends parallel to the flap 5, a third leg 23 which extends parallel to the first leg 21, and a fourth leg 24 which extends parallel to the flap 5. Secured to each of the first legs 21 is a respective substantially C-shaped traction stirrup or bow member 25 which passes through the cylinder 10, through slots 26 provided therein. The piston 13 which is longitudinally slidably arranged in the cylinder and which is in sealed relationship with respect to the inside wall surface thereof presses with its end face against the traction stirrup member in such a way that the application of cleaning fluid against the piston 13 causes pivotal movement of the first leg 21 about the pivot axis or spindle 8. The traction stirrup member operatively engages each of the first legs 21 of the pivot arms 18 approximately half way along the length thereof.

In the case of the cleaning device 1 shown in FIGS. 1 and 2 the cleaning fluid passes into the cylinder 10 by way of a supply line identified by reference numeral 15. The cleaning fluid goes to the spray nozzle 7 by way of the feed line 16. In the situation where a plurality of spray nozzles 7 are secured to the spray nozzle housing 6, cleaning fluid distribution is to be implemented in the housing 6.

In the embodiments shown in FIGS. 3 to 5 the cylinder 10 is open at its end, in the region of the slots 26. Sealing of the cylinder 10 is effected by way of a sealing lip 38 which is let into a peripherally extending groove 27 in the piston 13 and seals the latter off in relation to the inside wall surface of the cylinder 10.

As already described in relation to the preceding embodiment, the movement of the spray nozzle 7 into the inwardly pivoted rest position is produced by way of the return spring 17.

A third embodiment of the cleaning device 1 is shown in FIGS. 6 to 13. In this embodiment the actuator is in the form of a hydraulic rotary drive. Just as in the case of the second embodiment, this embodiment has a pivot arm arrangement comprising two pivot arms 18 which accommodate the spray nozzle housing 6 between them and carry the flap 5. It will be noted however that the hydraulic rotary drive 28 does not extend transversely with respect to the pivot axis 8, as is the case with the preceding embodiments, but parallel to or on the pivot axis 8. That is also particularly clearly apparent from FIG. 8. Here the cylinder 10 of the rotary drive 28 extends between the pivot arms 18, while the cylinder 10 has a mounting trunnion 29 which is integrally connected thereto and which is rotatably accommodated in a mounting bore 30 in a pivot arm 18. The piston 13 is arranged slidably in the cylinder 10 on the pivot axis 8, with the piston being open at its end which is in opposite relationship to the hydraulically operative surface 31. The open end of the piston 13 accommodates a rotor 32 forming a second mounting trunnion 33 which is non-rotatably connected to a pivot arm 18. The rotor 32 is guided in the peripheral direction within the piston 13 so that, when the piston 13 is subjected to pressure, it is displaced axially relative to the rotor 32 in the direction of the action of the force applied by the cleaning fluid. In that case, by virtue of the positive guidance for the rotor 32 at its outside periphery, as will be described in greater detail hereinafter, the rotor 32 is caused to perform a rotary movement which ultimately produces rotation of the pivot arms 18 about the pivot axis 8.

As can be seen in particular from FIGS. 11 and 13, the rotor 32 is provided at its outside periphery with two helical openings 34 which are arranged displaced at 180° relative to each other and through which passes a pin 35. In addition (see FIG. 10) the pin 35 also passes through the outside wall 36 of the cylinder 10 and slots 26 provided in the cylinder 10. The piston 13 is fixed non-rotatably with respect to the cylinder 10 by the pin 35 passing through the slots 26. When the piston is subjected to the action of cleaning fluid, the pin 35 will perform a sliding movement within the helical or spiral openings 34, which causes a superimposed linear movement of the piston 13 and rotary movement of the rotor 32.

It will be self-evident to the man skilled in the art that, as an alternative to the pin 35, the piston 13 may be provided with a female screwthread and the rotor 32 may be provided with a correspondingly steep male screwthread. In addition, a means for preventing rotation of the piston 13 must be provided on the outside periphery of the piston 13, in a condition of co-operating with the inside wall surface of the cylinder 10. As another alternative the slots 26 could have an helical shape, whereas the pin 35 could be fixed in a bore in the rotor 32.

The linear movement of the piston 13 takes place in opposition to the force of a compression spring 37 which at one end bears against the rotor 32 and at the other end against the pin 35.

FIG. 8 shows the piston 13 in the rest position of the cleaning device 1, whereas FIG. 12 shows the piston 13 in the fully extended position in relation to the rotor 32.

The piston 13 is sealed in relation to the inside wall surface of the cylinder 10 by a peripherally extending sealing lip 38. As also in the case of the above-described embodiments, the cleaning fluid is passed into the cylinder 10 by way of a supply line 15. The cleaning fluid goes to the spray nozzle 7 by way of a feed line 16.

In the embodiments shown in FIGS. 14 and 15, the actuator corresponds to that of the second embodiment (FIGS. 3 to 5), but it will be noted that the pivot axis 8 extends markedly below the outside surface of the bumper 2 on the side thereof which is towards the front headlamps 3. The spray nozzle 7 is mounted directly on the outside of a cover which is identified by reference numeral 39 and is thus also visible in the rest position. The cover 39, like also the flap 5, is fitted into an opening 4 in the bumper 2 terminating at its edge in flush relationship with the outside of the bumper 2. The actuator is fixed by way of a holder 12 in the bumper 2 somewhat below the front headlamp 3 in question. The pivot arms 18 are of such a configuration and arrangement that a rotational movement about the pivot axis 8 causes the cover 39 to be lifted out of the opening 4 so that the spray nozzle 7 can be placed in the position shown in FIG. 15 in a favourable location in front of or below the respective front headlamp 3 in question.

Finally reference is made to FIGS. 16 and 17 showing a fifth embodiment of the cleaning device 1 according to the invention. In this case the cleaning device 1 approximately corresponds to the cleaning devices 1 shown in FIGS. 14 and 15, but the actuator is in the form of the above-described hydraulic rotary drive 28.

LIST OF REFERENCES 1 cleaning device
2 bumper
3 front headlamp
4 opening
5 flap
6 spray nozzle housing
7 spray nozzles
8 pivot axis
9 pivot lever
10 cylinder
11 fixing bracket
12 holder
13 piston
14 piston rod
15 supply line
16 feed line
17 return spring
18 pivot arm
19 mounting bores
20 mounting projections
21 first leg
22 second leg
23 third leg
24 fourth leg
25 traction stirrup member
26 slots
27 groove
28 rotary drive
29 first mounting trunnion
30 mounting bore
31 hydraulically operative piston surface
32 rotor
33 second mounting trunnion
34 opening
35 pin
36 outside wall surface
37 compression spring
38 sealing lip
39 cover

What is claimed is:

1. A device for cleaning headlamps or windscreens on a motor vehicle by means of cleaning fluid which is to be discharged through at least one spray nozzle, wherein in a rest position the spray nozzle is arranged concealed and/or recessed in the bodywork of the motor vehicle and by means of an actuator can be positioned in a cleaning position in which discharge of the cleaning fluid is effected, characterised in that the spray nozzle is arranged on a mounting which is secured pivotably to the bodywork and which in the rest position is pivoted into the bodywork and which can be pivoted out into the cleaning position by the actuator, characterised in that the actuator is in the form of a piston-cylinder unit operated by hydraulic pressure of the cleaning fluid and that the piston of the actuator acts with its end directly on a traction element that passes into the cylinder and which is connected to a pivot arm or a pivot lever.

2. A device according to claim 1 characterised in that the spray nozzle is arranged under a pivotable flap which in the rest position covers an opening in the bodywork in flush relationship.

3. A device according to claim 2 characterised in that the flap can be extended outwardly at its side which faces towards the surface to be cleaned, with a pivot axis thereof extending approximately at the level of the outer surface of the bodywork.

4. A device according to claim 1 characterised in that the actuator is operated hydraulically, preferably by the cleaning fluid.

5. A device according to claim 1 characterised in that the actuator acts on said pivot arm or pivot lever which produces the outward extension movement of the spray nozzle into the cleaning position.

6. A device according to claim 1 characterised in that the spray nozzle is held in the rest position by a return spring.

7. A device according to claim 1 characterised in that there is provided a pivot arm assembly comprising two pivot arms which are arranged rotatably about a common pivot axis.

8. A device according to claim 1 characterised in that the spray nozzle (7) is arranged on a cover (39) which can be lifted out of the bodywork and which can be pivoted into a position in front of the surface to be cleaned and which in the rest position closes an opening in the bodywork in flush relationship.

9. A device according to claim 8 characterised in that the spray nozzle (7) is fixed on the outside of the cover (39).

10. A device according to claim 1 characterised in that at least one duct for passing the cleaning fluid to the spray nozzle (7) is provided in at least one pivot arm (18).

11. A device according to claim 1 characterised in that it is integrated into the bumper or the trim cladding thereof or the headlamp assembly of a motor vehicle.

\* \* \* \* \*

UNITED STATES PATENT AND TRADEMARK OFFICE
CERTIFICATE OF CORRECTION

PATENT NO. : 6,854,666 B2
DATED : February 15, 2005
INVENTOR(S) : Jenkins

It is certified that error appears in the above-identified patent and that said Letters Patent is hereby corrected as shown below:

Column 8,
Line 60, after "on", delete "said" and insert -- at least one --.

Signed and Sealed this

Tenth Day of January, 2006

JON W. DUDAS
*Director of the United States Patent and Trademark Office*